United States Patent
Holmes

[19]

[11] 3,750,560

[45] Aug. 7, 1973

[54] DEEP FAT FRYER

[75] Inventor: Brandon M. Holmes, Nashville, Tenn.

[73] Assignee: Progressive Products Corporation, Nashville, Tenn.

[22] Filed: Sept. 3, 1971

[21] Appl. No.: 177,549

[52] U.S. Cl. .................... 99/408, 233/8, 210/DIG. 8
[51] Int. Cl. ............................................ A47j 37/12
[58] Field of Search ...................... 99/408, 330, 107; 233/8, 23, 46; 210/DIG. 8

[56] References Cited
UNITED STATES PATENTS

| | | | |
|---|---|---|---|
| 3,398,673 | 8/1968 | Koplock | 99/408 |
| 2,646,921 | 7/1953 | Adams et al. | 233/8 X |
| 3,610,133 | 10/1971 | Mies, Jr. et al. | 99/408 X |
| 3,501,316 | 3/1970 | Guthrie, Sr. | 99/408 X |

*Primary Examiner*—Leon G. Machlin
*Attorney*—A. Yates Dowell, Jr.

[57] ABSTRACT

Apparatus for cooking foods by immersion in a cooking medium maintained at a predetermined temperature and in which the liquid cooking medium is constantly circulated in a manner that particulate matter is removed from the surface and from the bottom of the cooking vessel and such particulate matter is removed from the circulating cooking medium without interrupting the flow of such medium. The particulate matter separated from the cooking medium is discharged into a collection receptacle which can be removed when desired without draining the cooking medium from the vessel.

6 Claims, 9 Drawing Figures

INVENTOR
Brandon M. Holmes

BY
ATTORNEYS

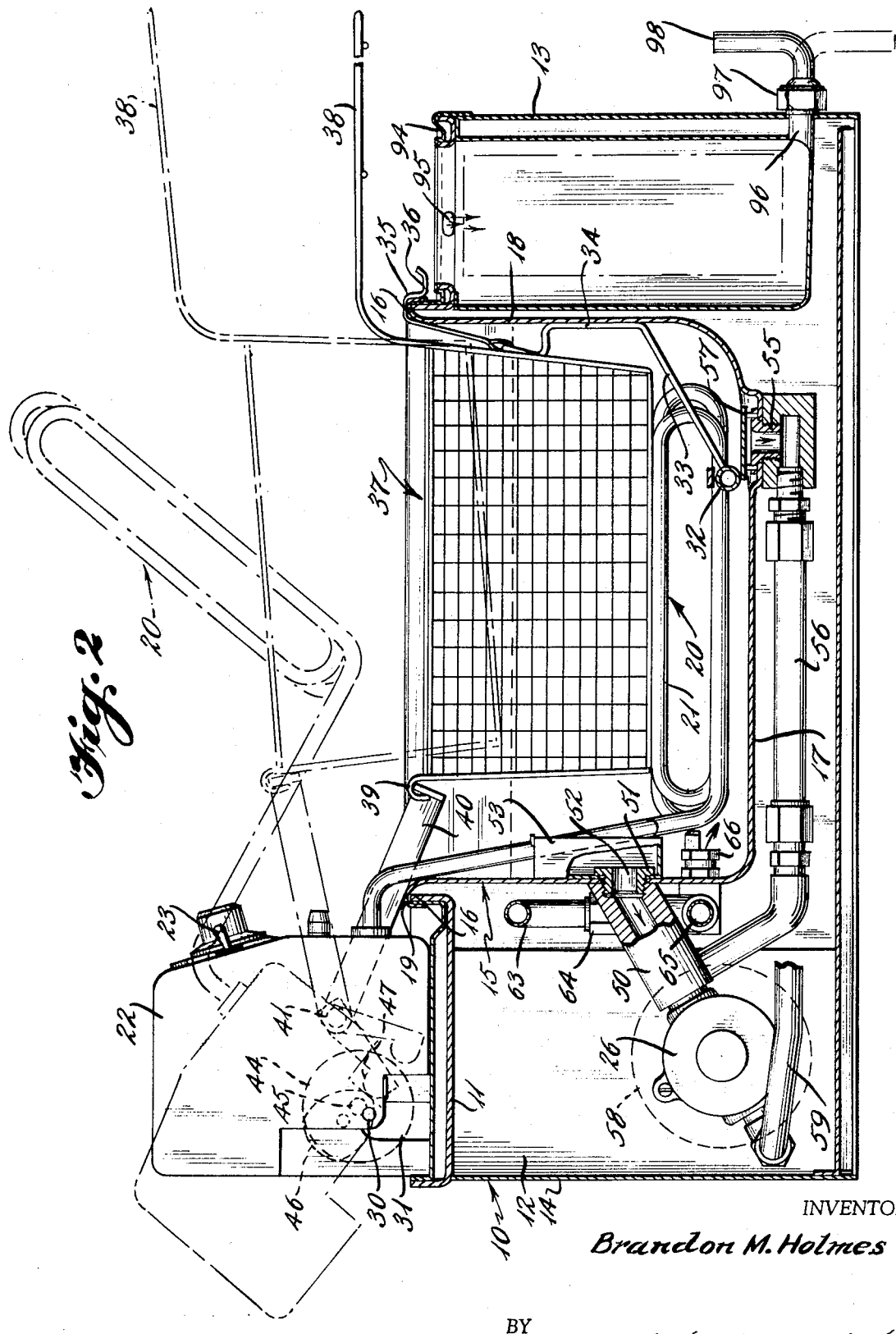

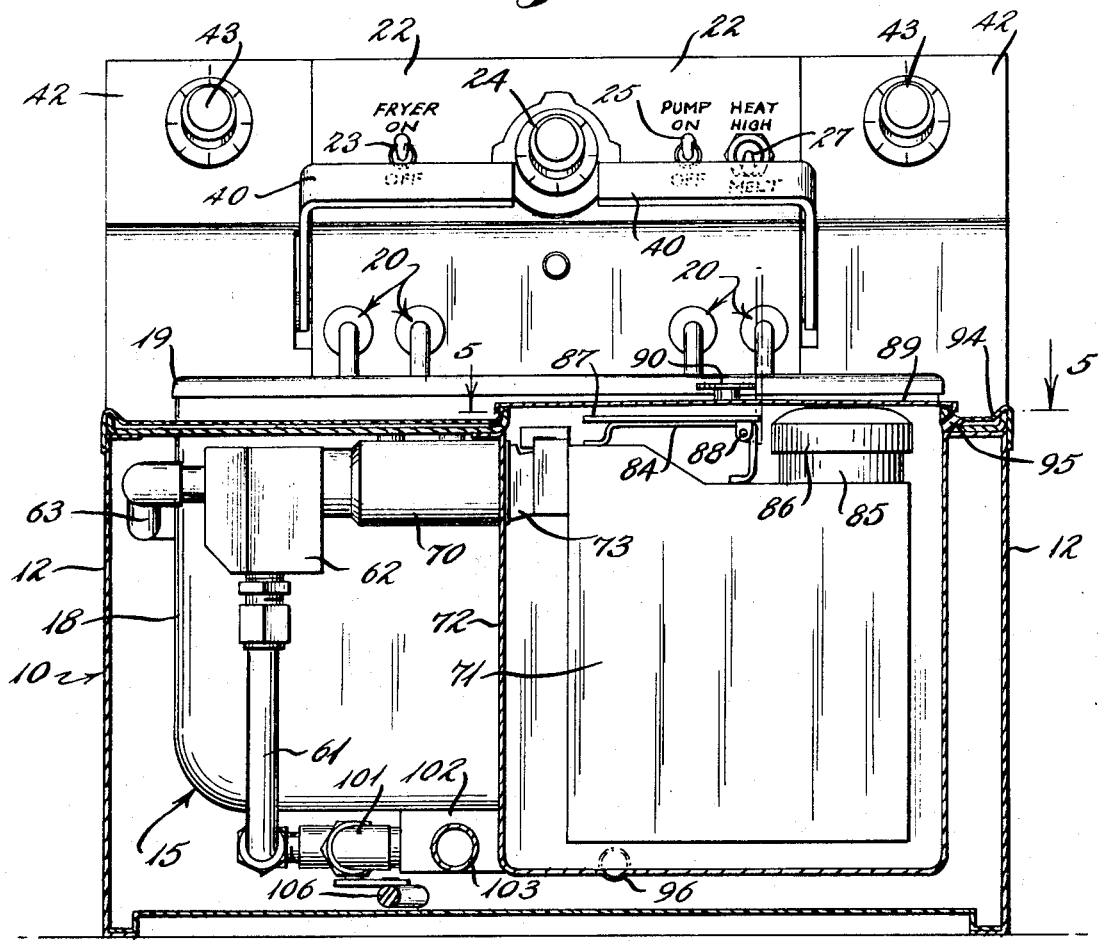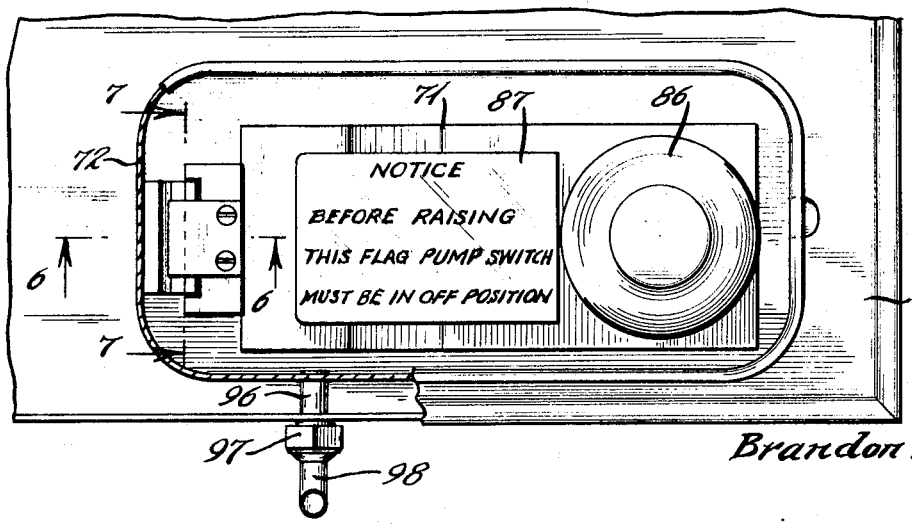

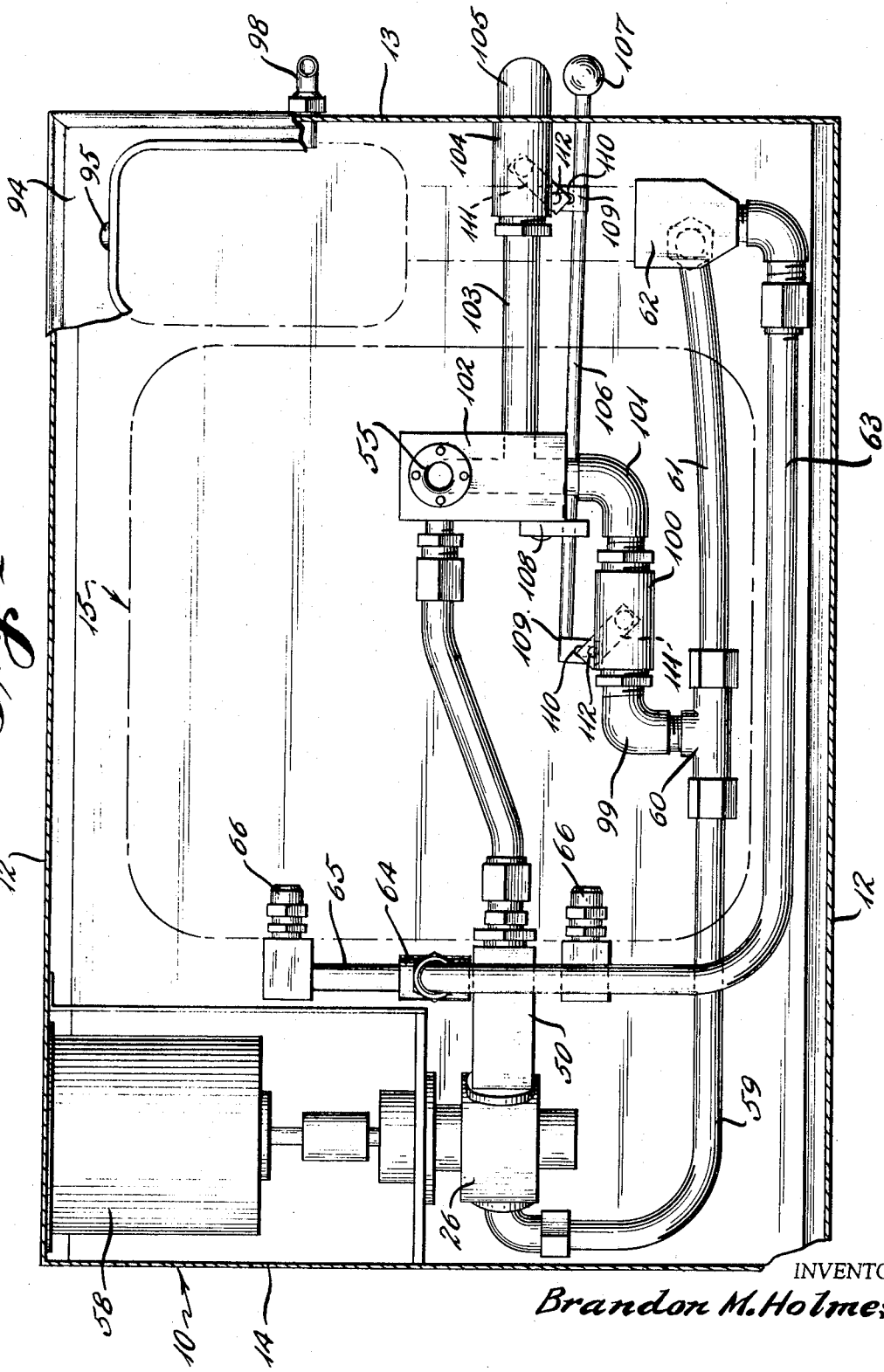

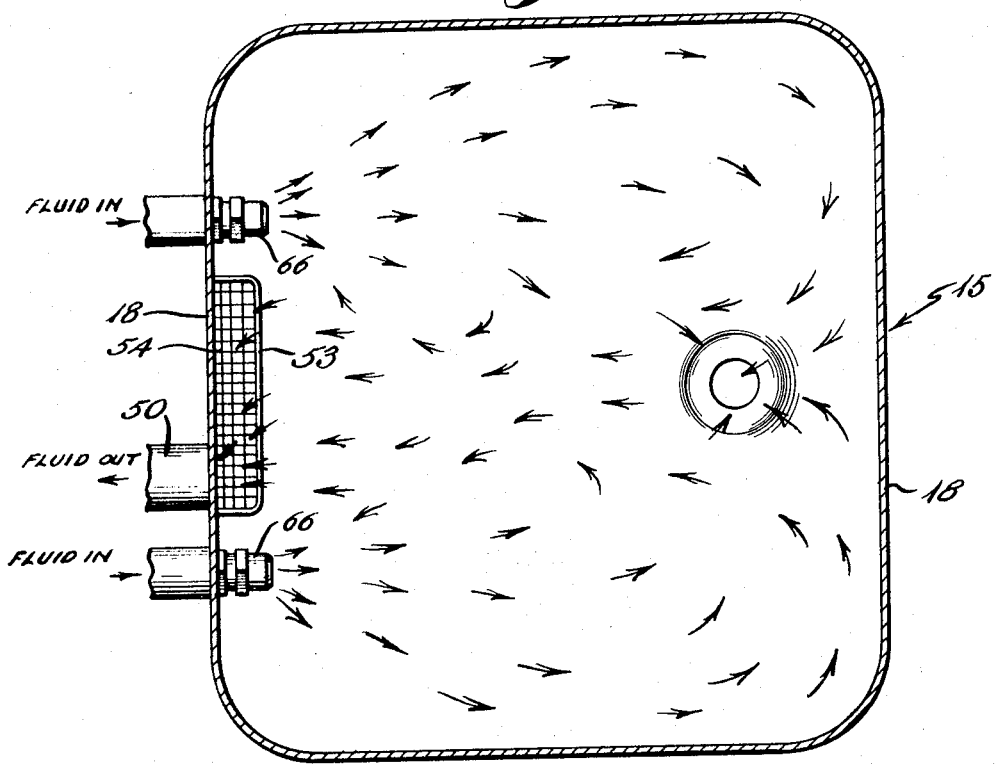
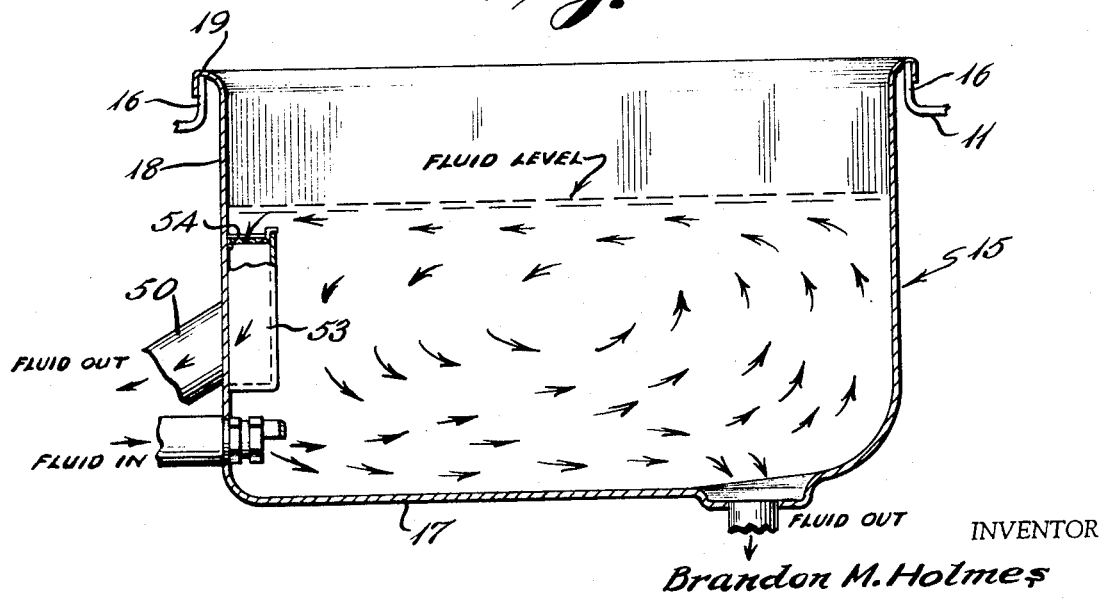

DEEP FAT FRYER

BACKGROUND OF THE INVENTION

1. Field of the Invention

This invention relates generally to the preparation of foods of different kinds and relates particularly to cooking vessels known in the trade as deep fat fryers.

2. Description of the Prior Art

Heretofore efforts have been made to prepare foods for human consumption including by the use of deep fat fryers in which an operator places foods to be cooked in a basket and lowers the food into the cooking medium which has been heated to a predetermined temperature. Many prior art structures have merely heated the cooking medium within the cooking vessel so that small pieces of food, including meat and bread crumbs, which become separated from the major portion of the food, have remained in the cooking medium. Normally the separated food particles float at the top of the cooking medium until most of the moisture is cooked out, after which the food particles sink to the bottom of the vessel where they become charred by the constant high heat of the cooking medium. These charred particles have imparted an undesirable flavor to the food being cooked and it has been necessary to drain the cooking medium from the vessel at relatively short periods to remove the charred particles.

Some efforts have been made to circulate the cooking medium during the cooking process to maintain a more constant temperature as well as to remove particles of food which have been separated from the area of the heating elements to reduce the undesirable effect of the charred material. An example of this type of device is described in the patent to Quednau U.S. Pat. No. 3,410,199.

In most of these devices the food particles are merely trapped within a basket remote from the heating elements but still within the cooking vessel. However, these particles remain within the cooking medium and therefore the disagreeable effects are merely delayed for a short period of time. Devices have been provided with inline filters through which the cooking medium is circulated and in which the filters are supposed to remove food particles from the path of flow of the cooking medium. An example of this type of structure is the patent to Koplock U.S. Pat. No. 3,398,673. However, this type of structure is merely a sediment trap in which the cooking medium flows through the trap and through the charred food particles so that as a result the disagreeable flavor is not removed from the cooking medium.

SUMMARY OF THE INVENTION

The present invention is an apparaus for cooking foods of various kinds, such as chicken, seafoods, potatoes, onion rings, and the like, by the deep fat frying method. In this structure the cooking medium is continuously circulated during the entire time that food is immersed within the cooking medium, as well as for a short period of time after the food has been removed. The length of time that the food is immersed is controlled by timer mechanisms and structure is provided for automatically removing the food from the cooking medium after the required period of time. The circulating cooking medium passes through a centrifugal separator which removes particles of food from the path of flow of the cooking medium and discharges such particles of food into a holding tank or receptacle through which the cooking medium normally does not pass. The cooking medium is removed from the vessel adjacent to the upper surface of the cooking medium as well as from the bottom of the vessel so that particles of food which are still cooking and floating on the top of the cooking medium, as well as the particles of food on the bottom of the vessel are removed. The receptacle into which the particles of food are discharged can be removed, emptied and replaced without draining the cooking medium from the cooking vessel.

BRIEF DESCRIPTION OF THE DRAWINGS

FIG. 2 is an enlarged longitudinal cross-section on the line 2—2 of FIG. 1.

FIG. 3 is an enlarged transverse cross-section on the line 3—3 of FIG. 1.

FIG. 4 is an enlarged horizontal section on the line 4—4 of FIG. 1.

FIG. 5 is an enlarged section on the line 5—5 of FIG. 3.

FIG. 8 is a schematic representation of the cooking vessel illustrating the generally horizontal flow path of the cooking medium.

FIG. 9 is a schematic representation of the generally vertical flow path of the cooking medium through the cooking vessel of FIG. 8.

DESCRIPTION OF THE PREFERRED EMBODIMENT

Figure 1:
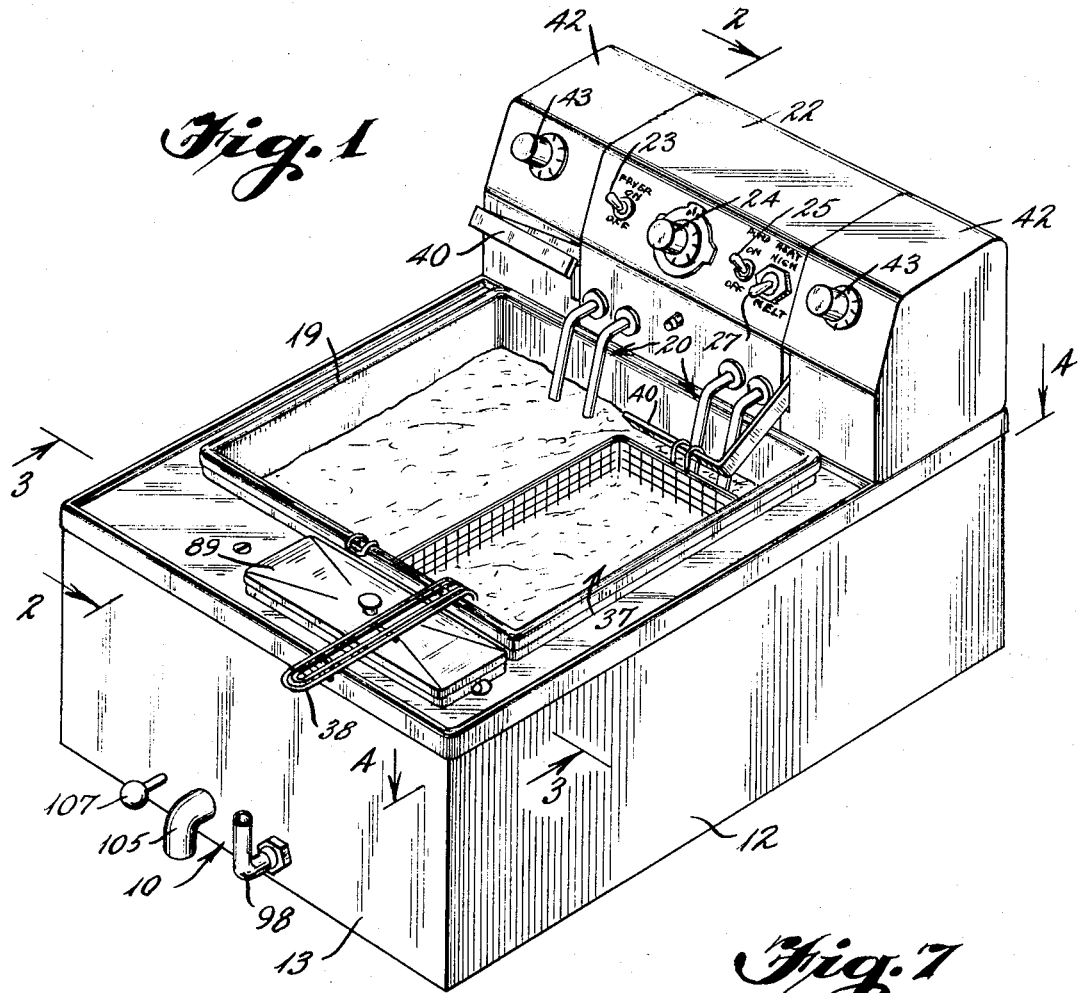
FIG. 1 is a perspective illustrating one application of the present invention.
Figure 6:
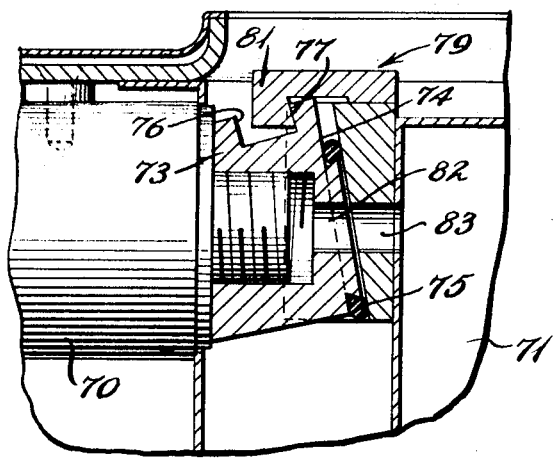
FIG. 6 is an enlarged section on line 6—6 of FIG. 5 and illustrating the collection receptacle connection.
Figure 7:
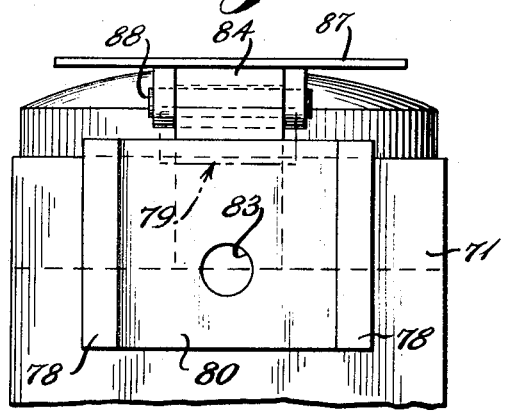
FIG. 7 is an enlarged section on the line 7—7 of FIG. 5 illustrating the connecting joint of the collection receptacle.

With continued reference to the drawings, the deep fat fryer of the present invention includes a housing 10 having a top wall 11, side walls 12 and front and rear walls 13 and 14, respectively. Generally centrally of the top wall 11, an opening for a cooking vessel 15 is provided by removing portions of the top wall and providing upwardly extending flanges 16 adjacent to the opening.

The cooking vessel can be made of any desired material such as sheet stainless steel formed in a deep draw process to provide a bottom wall 17 and side walls 18. The upper edge of each of the side walls terminates in a reversely bent hook portion 19 adapted to overlie the flanges 16 of the top wall 11 and such hook portions are secured thereto in any desired manner, as by welding or the like.

The cooking medium, such as vegetable oil, peanut oil, shortening, or the like, in either liquid or congealed state, is introduced into the vessel 15 and is heated to a desired cooking temperature in any desired manner. As illustrated, a pair of Calrod or electrical resistance heating elements 20 are provided having a series of coils 21 located adjacent to the bottom wall 17 of the cooking vessel and having terminal ends extending upwardly to a central control module 22. The Calrod heating elements are connected to a source of electrical energy within the central module 22 by means of quick disconnect plugs (not shown) to facilitate quick and easy repair of the units. The central control module 21 includes an on-off switch 23 for the Calrod heating elements 20, an adjustable thermostat 24 for controlling the temperature of the cooking medium, an on-off switch 25 for a pump 26 and a double throw switch 27 which also controls the Calrod heating elements 20.

In a first or high heat position of the double throw switch 27, the Calrod heating elements are connected in parallel and a full amount of electrical energy can be supplied to each of the Calrod heating elements in accordance with the value set by the thermostat 24. In a second or melt position of the double throw switch 27 the Calrod heating elements are connected in series so that the energy supplied to the heating units is greatly reduced. This position of the switch 27 is used primarily when cooking medium in a congealed state, such as shortening or the like, is introduced into the cooking vessel and low heat must be supplied by the heating elements to liquefy the shortening without scorching the same.

In order to remove the Calrod heating elements 20 from the vessel 15 for cleaning the vessel, the central control module 22 is connected to a pivot 30 carried by upright lugs 31 mounted on the top wall 11. As illustrated in FIG. 2, the Calrod heating elements 20 are connected by a crossmember 32 and such crossmember is welded or otherwise attached to a strap or rod 33 having a portion 34 adapted to abut one of the side walls 18 of the cooking vessel. A hook 35 is connected to the free end of the strap 33 and such hook overlies the hook portion 19 of one of the side walls 18 to limit downward movement of the Calrod heating elements into the cooking vessel 15. The hook 35 includes a tab 36 which can be grasped by an operator so that an upward force can be applied to the coils 21 of the Calrod heating elements. This upward force causes the central control module 22 to swing about the pivots 30, as illustrated in phantom in FIG. 2, so that the heating elements are located exteriorly of the cooking vessel 15.

In order to cook food after the cooking medium has been heated to the desired temperature, a pair of baskets 37 are provided into which food is placed. Each of the baskets 37 has a manipulating handle 38 at one end and a hook 39 at the opposite end which is adapted to engage a basket lift arm 40 at each side of the cooking vessel. Each lift arm is swingably mounted on a pivot 41 intermediate its ends and such pivot is carried by an end module 42 located at each end of the central control module 22. Each of the end modules 42 includes a timer control 43 which controls a motor 44 having an outer shaft 45. A cam 46 is mounted on the end of the shaft 45 and such cam is adapted to engage an enlargement 47 on the end of the lift arm 40 to cause the lift arm to swing about the pivot 41 and raise and lower the basket 37. The timer control 43 controls a timer (not shown) to limit the length of time that the food being cooked is immersed in the cooking medium. When the time set has expired, the motor 44 rotates the cam 46 to raise the lift arm and raise the basket from the cooking medium.

Many of the pieces of food being cooked in the cooking medium are coated with bread crumbs or the like before the individual pieces are placed in the baskets 37 and some of these pieces of bread crumb fall from the food when placed in the baskets and other pieces become detached after the basket has been lowered into the cooking medium. When pieces of bread crumb fall into the cooking medium, they normally remain at the top of such medium until most of the moisture has been removed therefrom after which the particles sink to the bottom of the cooking vessel 15.

It is desirable to remove the particles from the cooking medium before they char and impart an undesirable taste to the cooking medium. In order to do this, the pump 26 is connected by a manifold 50 to a plug 51 mounted on one of the side walls 18 of the cooking vessel. The plug 51 has a bore 52 extending therethrough and providing communication between the interior of the cooking vessel and the manifold 50. Preferably a well 53 is disposed about the plug 51 and such well includes imperforate side, end and bottom walls with an open top disposed slightly below the normal fluid level of the cooking medium. If desired, a screen 54 can be placed over the well 53 to keep relatively large pieces of food from entering the well 53. The cooking medium is circulated within the vessel 15 in a manner which will be described later so that the food particles floating on top of the cooking medium are directed to the well 53 and are removed from the vessel 15 through the manifold 50.

At the bottom of the vessel, a drain plug 55 is provided connected to one end of a drain line 56 and the opposite end of such drain line is connected to the manifold 50. With this construction food particles which sink to the bottom of the cooking vessel 15 are swept to the drain plug 55 by the circulation of the cooking medium within the cooking vessel and are discharged through the drain line 56 into the manifold 50. If desired, a screen 57 may be placed over the drain plug 55 to limit the size of particles which can pass through such plug.

The inlet side of the pump 26 is connected to the manifold 50 and such pump can be of any conventional construction, although a positive displacement helical gear type pump has been found particularly suitable. In this structure a pump motor 58 drives the helical gears and the cooking medium must pass around such gears with the result being that all of the food particles are ground into relatively small pieces before being discharged from the pump. The outlet of the pump is connected to one end of a pipe 59 and the opposite end of such pipe is connected to a T-coupling 60. The coupling 60 is connected by a pipe 61 to a cyclone filter or centrifugal separator 62.

In the centrifugal separator, the particles of food are separated from the cooking medium after which the clean cooking medium passes through an outlet pipe 63 to a T-coupling 64 connected to a header 65 located adjacent to the lower portion of one of the side walls 18 of the cooking vessel 15. A fan spray type nozzle 66 is located at each end of the header 65 and such nozzles extend through the adjacent side walls 18 and project into the lower portion of the cooking vessel.

As illustrated best in FIG. 8, the cooking medium discharged through the nozzles 63 fans out and is directed downwardly toward the bottom wall 17 of the cooking vessel to sweep particles of food toward the drain plug 55 so that the particles of food are removed as soon as they fall into the cooking vessel. As illustrated in FIG. 9, the flow of cooking medium is directed up the side wall opposite the nozzles 65 substantially to the top of the liquid level and sweeps particles of food floating on the surface toward the well 53 so that the floating particles likewise will be removed.

The circulating of the cooking medium within the cooking vessel continually passes the cooking medium into direct contact with the coils 21 of the Calrod heating elements and thereby eliminates any hot spots and maintains a substantially constant temperature throughout the cooking medium within the vessel 15.

The particles of food which are separated from the cooking medium within the centrifugal separator are discharged through a line 70 into a holding tank or receptacle 71 normally located within a well 72 suspended from the top wall 11. Depending upon the food being prepared and the quantity of food particles which become separated therefrom, it is necessary to discharge food particles from the receptacle 71 periodically. In order to do this, a quick disconnect self-aligning self-sealing connection is provided between the line 70 and the receptacle 71. This connection includes a connector block 73 fixed to the end of the line 70 and such connector block has an angularly disposed face 74 which tapers downwardly from an upper position close to the line 70 to a lower position spaced away from such line. An O-ring seal 75 is mounted on the face 74. The upper portion of the connector block 73 is provided with a recess 76 having an angularly disposed surface 77 generally parallel to the face 74. A pair of outwardly extending ears or guides 78 are mounted generally vertically on opposite sides of the connector block 73.

A hook member 79 is welded or otherwise attached to the receptacle 71 and such hook member is of a width to fit between the guides 78 of the connector block to prevent lateral movement of the receptacle. The hook member 79 is provided with an angularly disposed face 80 generally complementary to the face 74 of the connector block and is adapted to engage the O-ring seal 75. The hook member 79 is provided with a downwardly extending hook 81 adapted to overlie a portion of the connector block 73 and be received within the recess 76 to support the weight of the receptacle 71. The connector block 73 and the hook member 79 have aligned bores 82 and 83, respectively, providing communication between the line 70 and the receptacle 71.

In order to remove the receptacle from the well 72 and discharge the material therefrom, a handle 84 is mounted on top of the receptacle 70. A discharge neck 85 normally closed by an oil-tight cap 86 is located adjacent to the handle. Preferably a flag or shield 87 is swingably mounted on the handle 84 by means of pivot pins 88 and such shield preferably includes warning indicia indicating that the pump switch must be off before the receptacle 71 is removed. When the shield 87 is swung to a generally vertical position to provide access to the handle 84, such shield prevents heat being poured through the neck 85 from burning the hand of the operator. As illustrated best in FIG. 3, a cover 89 with a lifting knob 90 is placed over the well 72 when the receptacle is in position and must be removed before the receptacle 71 can be removed.

The top wall 11 of the housing is covered by a drip pan 94 which is inclined slightly toward the front of the housing so that the cooking medium which drips from the baskets 37 and the food product carried thereby falls onto the drip pan and flows toward the front of the housing. As illustrated in FIG. 3, a discharge opening or chute 95 extends from the drip pan 94 into the well 72 so that fluid material in the drip pan flows by gravity into the well 72. In order to discharge fluid from the well 72 periodically, a drain line 96 extends from the well 72 through the wall 13 of the housing 10. Exteriorly of the housing 10, the drain line 96 is connected to a ball and socket type connection 97 to which an open elbow pipe 98 is connected. As illustrated in full lines in FIG. 2, when the discharge end of the pipe 98 extends upwardly, the fluid is connected within the well 72. The elbow pipe 98 is capable of being rotated approximately 180° to a position shown in phantom lines in FIG. 2 at which time the fluid within the well 72 is discharged into a suitable receptacle (not shown). When the fluid has been discharged from the well, the elbow pipe again is rotated to the upright position.

With particular reference to FIG. 4, it is necessary to drain the cooking medium from the vessel 15 at least at the end of each day's cooking so that the equipment can be cleaned. In order to facilitate removal of the cooking medium from the vessel, the T-coupling 60 in the fluid circulating system is connected by an elbow 99 to a normally closed valve 100. The valve 100 in turn is connected by a line 101 to a drain header 102 connected to the drain plug 55. An outlet line 103 connects the header 102 to a normally closed valve 104 which in turn is connected to a drain nozzle 105 located exteriorly of the housing 10. When it is desired to drain the cooking medium from the vessel 15, it is necessary to operate the valves 100 and 104 to permit the cooking medium to flow through the drain nozzle 105.

In order to operate the valves, an operating rod 106 having a knob or handle 107 at one end is axially slidably mounted in the housing 10 and in a guide block 108 mounted on the header 102. The operating rod 106 has a pair of outwardly extending lugs 109 each of which has a slot 110. The lugs 109 are located adjacent to the valves 100 and 104 and each of such valves is provided with an operating lever 111 having a pin 112 received within the slot 110 of the corresponding adjacent lug. When the operating rod 106 is moved outwardly, the levers 111 are operated to open the valves 100 and 104 and permit the cooking medium to flow through the drain nozzle 105.

At the beginning of operation of the device, the Calrod heating elements are lowered into the cooking vessel 15 after which cooking medium is introduced into such vessel. The double throw switch 27 is moved to the melt position, particularly if the cooking medium is congealed, to slowly begin heating the cooking medium. After the cooking medium has been partially heated and has liquefied completely, the switch 27 is moved to the high heat position and the adjustable thermostat 24 is set to a desired temperature. When the cooking medium has reached the desired temperature, food to be cooked is placed in one or both of the baskets 37 and the timer control 43 for each basket is set for the desired time. This operates the motor 44 to rotate the shaft 45 and the cam 46 to lower the lift arms 40 so that the baskets 37 are lowered into the cooking medium.

Operation of the timer controls 43 energizes the pump motor 58 so that the pump 26 circulates cooking medium through the centrifugal separator 62 and discharges such medium through the header 65 and the nozzles 66 back into the cooking vessel 15. When the baskets have remained within the cooking medium for the desired length of time, the timer control 43 again operates the motor 44 to raise the lift arms 40 which in turn raises the baskets 37 out of the cooking medium.

As long as one of the baskets remains within the cooking medium, the pump motor 58 continues to operate the pump 26 and to circulate the cooking medium. The pump motor 58 is under the influence of a delayed timer (not shown) so that when both baskets have been removed from the cooking vessel, the pump motor continues to operate for a short period of time to remove all food particles from the vessel after which the pump motor 58 stops to limit breakdown of the cooking medium through contact with the air. When one or both lift arm timer controls 43 again are set to a desired length of time, the pump motor 58 again operates to circulate the cooking medium.

I claim:

1. Cooking apparatus comprising a cooking vessel having a side wall and a bottom wall for containing a cooking medium, means within said vessel for heating said medium to a selected temperature, pump means located adjacent to said cooking vessel, means connecting the inlet side of said pump means to an upper portion of said cooking vessel for removing cooking medium from a position located adjacent to the liquid level within said vessel, means connecting the inlet side of said pump means to the bottom wall of said cooking vessel for removing cooking medium from the lower portion of said vessel, centrifugal separator means communicating with the outlet side of said pump means, at least one nozzle projecting through the side wall of said cooking vessel, pipe means connecting said centrifugal separator means to said nozzle and providing communication therebetween so that cooking medium discharged from said vessel passes through said separator means and thereafter is returned to said vessel, a discharge line connected to said separator means, a receptacle communicating with said discharge line in spaced relation with said separator means for receiving foreign particles removed from the cooking medium by said separator means, and means for removing particles from said receptacle, whereby the cooking medium is continuously circulated within said cooking vessel and foreign matter is continuously removed from the cooking medium as long as food is being cooked by the cooking medium.

2. The structure of claim 1, including at least one food holding basket at least a portion of which is to be immersed in said cooking medium, and means for lowering and raising said basket into and out of said cooking medium.

3. The structure of claim 1, including drain means for removing cooking medium from said vessel.

4. The structure of claim 1 including means for removing said particle receptacle.

5. The structure of claim 4 in which said means for removing said particle receptacle includes a connector block connected to said discharge line, said block having a first face, seal means on said first face, said receptacle having a hook member mounted thereon, said hook member having hook means engaging said connector block, said hook member having a second face complementary to the first face of said connector block and located in a position to engage said seal, said connector block and said hook member having generally aligned openings providing communication between said discharge line and said receptacle.

6. A deep fat fryer for cooking foods comprising a housing, a cooking vessel mounted in said housing and adapted to contain a cooking medium, at least one electrical resistance heating element swingably mounted on said housing, means for moving said heating element into and out of said cooking vessel, pump means carried by said housing, well means within said vessel having an opening below the normal liquid level of the cooking medium, a first pipe connecting said well means to the inlet side of said pump, drain means located in the bottom of said vessel, a second pipe connecting said drain means to the inlet side of said pump, a centrifugal separator connected to the outlet side of said pump, said centrifugal separator adapted to remove foreign particles from said cooking medium, at least one nozzle extending through the side wall of said vessel, said nozzle being connected to said centrifugal separator in a manner that clean cooking medium will flow from said centrifugal separator through said nozzle and into said cooking vessel under pressure, a collection receptacle connected to said centrifugal separator for receiving foreign particles removed from said cooking medium, said collection receptacle being located within said housing and adjacent to said separator, quick disconnect means connecting said receptacle to said separator so that the receptacle can be readily removed, and drain means for removing the cooking medium from said cooking vessel, whereby the cooking medium is continuously circulated within said cooking vessel and through said centrifugal separator and foreign particles are continuously removed from the cooking medium as long as food is being cooked by the cooking medium.

* * * * *